3,455,871
POLY-1-BUTENE MASTER BATCHES
Harry W. Coover, Jr., and Richard L. McConnell,, Kingsport, Tenn., assignors to Eastman Kodak Company, Rochester, N.Y., a corporation of New Jersey
No Drawing. Continuation of application Ser. No. 591,669, Oct. 31, 1966. This application Jan. 29, 1968, Ser. No. 701,471
Int. Cl. C08f 45/02, 45/04, 45/14
U.S. Cl. 260—41          3 Claims

ABSTRACT OF THE DISCLOSURE

Substantially crystalline homo- and copolymers of 1-butene as a concentrate carrier for non-olefinic additives readily dispersable therein for pigmenting various homo- and copolymers of alpha-monoolefins including styrene.

---

This application is a streamlined continuation of Ser. No. 591,669, now abandoned, which is a continuation in part of Ser. No. 303,130, filed Aug. 19, 1963 now abandoned.

This invention relates generally to the compounding of homo- and copolymers with various pigments, extenders, dyes and fillers, all of which may be grouped under the term "additives," and particularly concerns novel additive concentrates and their use in the compounding process for improving the dispersions of the additives in the polymers.

Polyolefins such as polyethylene and polypropylene are conventionally compounded with various types of additives for a variety of purposes. For example, dispersions of carbon black in polyethylene are known to retard oxidative degradation while dispersions of color pigments such as cadmium yellow therein impart desirable colors. Whether the additive be for coloring, filling, extending, oxidation retardation or other purposes, a uniform dispersion thereof in the polymer is necessary for maximum development of desired properties. For example, improved pigment dispersions provide improved weatherability, deeper color shades for a given overall pigment concentration and greater processing ease in such procedures as the spinning of pigmented fibers and the molding of bulk plastic.

Objects of the present invention therefore are: to provide improved means for facilitating the dispersal of additives in polymers; to provide a commercially useful process for improving the homogeneity of additive dispersions in polyolefins; and to render such process applicable to the difficultly compounded polyolefins.

These and other objects have been attained in accordance with the present invention through the discovery that the homopolymer of 1-butene and copolymers of 1-butene and certain other monomers act as excellent mediums for carrying various additives and dispersing them in polymeric materials. Monomers such as ethylene, propylene, 1-pentene, 1-hexene and 4-methyl-1- pentene can be copolymerized with 1-butene to provide copolymers useful as master batch materials. It is apparent, moreover, to one skilled in the art that a large variety of α-monoolefin or diene comonomers containing from 2 to about 18 carbon atoms are copolymerizable with 1-butene without destroying the beneficial effect of the 1-butene component in carrying the additive. Naturally, as the proportion of these other comonomers is increased, the effect of the 1-butene is correspondingly diminished and a proper balance for the particular application should be determined by routine investigation. In general, it may be said that the preferred copolymers would contain 75 to 99% 1-butene but copolymers containing as little as 20% 1-butene would be operable to a degree at least. Poly-1-butene master batches containing from about 10 to about 60% by weight of additives have been found to produce excellent dispersions thereof in homo- and copolymers of olefins and vinyl polymers such as polystyrene. The poly-1-butene master batches should contain at least about 5% by weight of dispersed additive. Useful results have been obtained with master batches containing from about 10% to about 90% by weight of dispersed additive.
2,cggmfimand The poly-1-butene is conventionally made by the polymerization of 1-butene to stereoregular polymer in the presence of conventional co-ordination catalysts such as those derived from combinations of violet titanium trichloride with organoaluminum compounds such as trialkylaluminums of dialkylaluminum halides. Specific examples include $Et_3Al/TiCl_3$, $(IsoBu)_3Al/TiCl_3$, $Et_2AlCl/TiCl_3$, $Et_2AlI/TiCl_3$ and the like. High temperature catalysts such as $LiAlH_4/TiCl_3$ may also be used. Other operable catalysts include the three-component catalysts such as those derived from violet titanium trichloride in combination with alkylaluminum dihalide or alkylaluminum sesquihalide and third components such as hexamethylphosphoric triamide, dimethylformamide, tributylamine and the like. Specific examples include 1/0.6/1

$$EtAlCl_2/(Me_2N)_3P(O)/TiCl_3$$

2/1/3 $Et_3Al_2Cl_3/(Me_2N)_3P(O)/TiCl_3$ and the like. Other titanium trihalide compounds which may be used include violet titanium trichloride which contains aluminum chloride cocrystallized with the $TiCl_3$, titanium tribromide, and titanium triiodide. The molecular weight of the poly-1-butene is not critical and inherent viscosities ranging from about 0.2 to about 5.0 have been successfully employed. While the hydrocarbon solvent extractable portion of the poly-1-butene polymer may be employed, it is preferred to use the crystalline portion or at least the total polymer formed, i.e., the unseparated amorphous and crystalline portions. The total polymer thus formed will be substantially crystalline while containing some small amount of amorphous polymer. Similarly, suitable copolymers of 1-butene are made in the presence of conventional co-ordination catalysts to form a substantially crystalline product.

The concentrates of this invention are readily prepared by blending the additive with poly-1-butene powder, granules or pellets in conventional equipment, such as Henschell mixers, Banbury mixers, extrusion equipment and hot rolls used for blending various agents with plastic materials. The presence of additives such as stabilizers, antioxidants, plasticizers, and lubricants normally used in polyolefins does not significantly detract from the beneficial properties of the poly-1-butene master batch. The master batches may be used in the form of powder, granules or pellets and may be blended with polyethylene, polypropylene and the other polymeric materials in the conventional equipment mentioned above.

Typical of the additives which may be used in the present invention are corbon black, calcium carbonate, magnesium carbonate, silicon dioxide, asbestos, china clay, zinc oxide, iron oxide, lignin, anthracite coal, bituminous coal, silicates, wood dust, cork dust, cellulose, coloring agents, etc. The following examples will further illustrate the invention.

Example 1

Poly-1-butene (I.V. of 2.5) made in the manner referred to above was blended with 25% by weight of the following additives:

Black Pearl 71 (carbon black)
Phthalocyanine Green
Phthalocyanine Blue
Asbestos
Calcium carbonate
Cab-O-Sil (silica)
Anthracite coal
Bituminous coal
Iron oxide
Cellulose
Cork dust
Cadmium yellow
Cadmium red
Benzidine yellow
Monarch 81 (carbon black)
Monarch 74 (carbon black)
Sterling L (carbon black)
Azulene
N-nitrosodiethylamine These blends contain 0.4% dilauryl thiodipropionate and 0.1% 4,4'-butylidene bis(6-tert.butyl m-cresol) to prevent degradation of the polymer during the blending and subsequent molding operations. The dispersions of the above additives were excellent. Similar excellent dispersions were obtained using 10%, 20%, 40%, 50%, and 60% of the additives. Master batches were also prepared using poly-1-butene having an I.V. of 0.2, 0.8, 1.2, 1.5, 1.7, 2.0, 3.5, and 5.0. All gave concentrates containing excellent dispersions of the additives.

Example 2

The above 25% Black Pearl 71 carbon black master batch was blended with polypropylene (I.V.=2.0) to give a concentration of 3% carbon in the polymer blend. When a small pellet was melted between two glass plates into a thin film it was readily apparent that the carbon black was uniformly distributed. The dispersion had an A rating (which is excellent) according to Western Electric standards (Western Electric Manufacturing Standard 17,000: Section 1059). In comparison, when a crystalline polypropylene master batch containing 25% carbon was blended with additional polypropylene to yield a 3% concentration of carbon black, the dispersion had a D rating (which is poor) according to Western Electric standards.

The physical properties of a polypropylene homopolymer containing 3% carbon black and prepared from the poly-1-butene master batch are compared with unpigmented polypropylene in the following table:

| Property | Polypropylene | Polypropylene containing 3% carbon |
|---|---|---|
| Melt flow | 1.9 | 1. |
| Inherent viscosity of molded specimen | 2.0 | 2.08 |
| Durometer hardness | 72 | 75 |
| Izod impact strength, notched (23° C.) | 0.5 | 0.5 |
| Izod impact strength, unnotched (23° C.) | 23 | 22 |
| Brittleness temperature, ° C | −4 | −2 |
| Stiffness, p.s.i. | 175,000 | 185,000 |

This data demonstrates an improvement in stiffness and no embrittlement of the polymer. Similar results were achieved when the other carbon black master batches in poly-1-butene were blended with polypropylene.

Example 3

The 20% Black Pearl 71 master batch described in Example 1 was blended with low-density polyethylene in a Banbury mixer to provide a composition containing 2% carbon black. The dispersion of carbon black was excellent and molded objects were uniform in color. This polymer had excellent resistance to the effects of sunlight and was not brittle. Similar results were achieved when the poly-1-butene carbon black master batches were blended with medium and also high-density polyethylene. The dispersions were much better than those prepared with conventional polyethylene carbon black master batches when compared in the manner of Example 2.

Example 4

The poly-1-butene master batches containing 25 and 50% calcium carbonate were blended with polyethylene, polypropylene and an 80/20 propylene/1-butene copolymer to provide uniformly white compositions having excellent physical properties.

Example 5

The poly-1-butene master batch containing 20% phthalocyanine blue was blended with polypropylene to provide a concentration of 2% pigment in the polypropylene. The pigmented polypropylene was spun into fibers which were quite uniform in color and had excellent physical properties. Similar results were obtained when the phthalocyanine green and carbon black master batches were blended with either polyethylene, polypropylene or a 90/10 propylene/1-butene copolymer and spun into fibers.

Example 6

The poly-1-butene master batch containing 20% Cadmium Red was blended with polystyrene to provide a concentration of 0.5% pigment in the polystyrene. When this polymer was molded into cups, the cups were uniformly colored. Similar results were obtained when the final concentrations of pigment in the polystyrene were 5% and 10%.

Example 7

A poly-1-butene carbon black master batch containing 50% carbon was blended with an ethylene/propylene copolymer rubber (I.V.=1.9) containing 60 mole percent ethylene to provide a final concentration of 20% carbon in the blend. The dispersion of carbon black was uniform. Similar good dispersions were obtained when other ethylene/propylene, ethylene/1-butene or propylene/1-butene copolymer rubbers were used. Good dispersions were also achieved when benzidine yellow, phthalocyanine green, phthalocyanine blue, and Cadmium Red master batches were blended with these copolymer rubbers to provide a final concentration of coloring agent of 0.2 to 10% by weight.

Example 8

A poly-1-butene master batch containing 40% asbestos was blended with polypropylene to yield a final blend containing 20% asbestos. Molded objects from this blend were quite rigid and had excellent impact strength.

Example 9

A 1-butene/propylene copolymer containing 90% 1-butene was blended with 40% by weight of Black Pearl 71 (carbon black). Excellent dispersions of carbon black were achieved when this master batch was blended with either polypropylene or polyethylene.

Similarly good results were obtained when master batches of phthalocyanine blue in 1-butene/propylene copolymers were dispersed in polypropylene and polyethylene.

One embodiment of the master batches of this invention is comprised of substantially crystalline poly-1-butene or substantially crystalline copolymers containing at least 75% by weight of 1-butene with at least one other copolymerizable monomer such as α-monoolefins and dienes containing from 2 to 18 carbon atoms with a dispersed additive present in amounts of at least 5% by weight.

Another embodiment of the present invention features polyethylene, polypropylene or mixtures thereof containing the master batches referred to above.

The invention has been described in detail with particular reference to preferred embodiments thereof but it It is claimed:

1. A method for uniformly dispersing a non-olefinic additive in polymeric material selected from the group consisting of homopolymers of propylene, ethylene, 1-butene, 4-methyl-1-pentene, 3-methyl-1-butene, 1-pentene and styrene, and copolymers of these materials with each other, comprising blending with said polymeric material at least one carrier selected from the group consisting of substantially crystalline poly-1-butene and substantially crystalline copolymers containing at least 75% by weight of 1-butene and at least one other copolymerizable monomer selected from the group consisting of ethylene, propylene, 1-pentene, 1-hexene and 4-methyl-1-pentene, said carrier containing at least from about 10% to about 60% by weight of dispersed non-olefinic solid additive selected from the group consisting of pigments, extenders, dyes and fillers, said carrier being used in sufficient amount to give a concentration of additive in the final blend of from about 0.1 to about 25% by weight of the final blend weight, and said additive being substantially homogeneously dispersable in said carrier.

2. The method of claim 1 wherein the carrier is substantially crystalline poly-1-butene and wherein the dispersed additive is present in said carrier in amounts of from about 10% to about 60% by weight.

3. The method of claim 2 wherein the polymeric material is polypropylene.

References Cited

UNITED STATES PATENTS

| 3,206,419 | 9/1965 | Pritchard et al. | 260—41 XR |
| 3,356,765 | 12/1967 | Musso et al. | 260—897 |

FOREIGN PATENTS

| 872,731 | 7/1961 | Great Britain. |
| 230,480 | 9/1959 | Australia. |

SAMUEL H. BLECH, Primary Examiner

K. E. KUFFNER, Assistant Examiner

U.S. Cl. X.R.

260—17.4, 17.5, 896, 897